(12) United States Patent
Holstun

(10) Patent No.: US 10,424,039 B2
(45) Date of Patent: Sep. 24, 2019

(54) DIGITAL WATERMARKS

(71) Applicant: HEWLETT-PACKARD DEVELOPMENT COMPANY, L.P., Houston, TX (US)

(72) Inventor: Clayton L. Holstun, San Marcos, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 258 days.

(21) Appl. No.: 15/023,565

(22) PCT Filed: Sep. 27, 2013

(86) PCT No.: PCT/US2013/062150
§ 371 (c)(1),
(2) Date: Mar. 21, 2016

(87) PCT Pub. No.: WO2015/047290
PCT Pub. Date: Apr. 2, 2015

(65) Prior Publication Data
US 2016/0239935 A1    Aug. 18, 2016

(51) Int. Cl.
*G06T 1/00* (2006.01)
*G06T 3/00* (2006.01)
*H04N 1/387* (2006.01)
*H04N 21/8358* (2011.01)
(Continued)

(52) U.S. Cl.
CPC .............. *G06T 1/0071* (2013.01); *G06T 3/00* (2013.01); *G06T 3/40* (2013.01); *H04N 1/32144* (2013.01); *H04N 1/387* (2013.01); *H04N 21/8358* (2013.01); *G06T 2201/0051* (2013.01); *G06T 2201/0061* (2013.01); *G06T 2201/0064* (2013.01)

(58) Field of Classification Search
CPC .................. G06T 1/0071; G06T 2201/0061
See application file for complete search history.

(56) References Cited

U.S. PATENT DOCUMENTS 6,711,306 B1 *  3/2004  Denber .................. G06T 7/12
                                                   382/190
6,785,423 B1 *  8/2004  Joshi ..................... H04N 19/70
                                                   375/E7.048
(Continued)

FOREIGN PATENT DOCUMENTS

JP       2005192001 A  *  7/2005  .......... G06T 1/0028
KR       100761230         9/2007
(Continued)

OTHER PUBLICATIONS

J. Gilson, "Lesson Twenty—Image Maps", 2012, http://www.htmltutorials.ca/lesson20.htm, p. 1-18.*
(Continued)

*Primary Examiner* — Gandhi Thirugnanam
(74) *Attorney, Agent, or Firm* — HP Inc. Legal Department

(57) ABSTRACT

A first instance of a digital watermark may be embedded into an image. The first instance may encode information. A second instance of the digital watermark may be embedded into the image. The second instance may encode the information of the first instance. The second instance may be a sized differently or may be larger than the first instance.

17 Claims, 4 Drawing Sheets

(51) Int. Cl.
*G06T 3/40* (2006.01)
*H04N 1/32* (2006.01)

(56) References Cited

U.S. PATENT DOCUMENTS

| | | | | |
|---|---|---|---|---|
| 7,436,977 | B2* | 10/2008 | Wang | G06T 1/0078 358/3.3 |
| 2002/0147910 | A1* | 10/2002 | Brundage | G06F 21/6209 713/176 |
| 2004/0042636 | A1* | 3/2004 | Oh | G06T 1/0071 382/100 |
| 2005/0180594 | A1* | 8/2005 | Isogai | G06T 1/0085 382/100 |
| 2005/0190948 | A1* | 9/2005 | Isogai | G06T 1/0028 382/100 |
| 2006/0215211 | A1* | 9/2006 | Kato | G06F 17/289 358/1.14 |
| 2007/0195991 | A1* | 8/2007 | Rhoads | G06Q 20/341 382/100 |
| 2007/0217651 | A1* | 9/2007 | Ishii | G06T 1/0071 382/100 |
| 2008/0187170 | A1* | 8/2008 | Matsubayashi | G09G 5/003 382/100 |
| 2009/0080689 | A1* | 3/2009 | Zhao | G06T 1/0035 382/100 |
| 2010/0177977 | A1* | 7/2010 | Seshadri | G06T 1/0021 382/248 |
| 2010/0180213 | A1* | 7/2010 | Karageorgos | G06F 17/243 715/753 |
| 2010/0246882 | A1* | 9/2010 | Ryan | G06T 1/0064 382/100 |
| 2011/0216936 | A1* | 9/2011 | Reed | G06K 9/00 382/100 |
| 2012/0062959 | A1* | 3/2012 | Wang | G06T 1/0021 358/3.28 |
| 2012/0213402 | A1* | 8/2012 | Moreno De Ayala | G06T 1/0071 382/100 |
| 2012/0301030 | A1* | 11/2012 | Seto | H04N 21/41407 382/190 |
| 2012/0321127 | A1* | 12/2012 | Dziech | H04N 19/60 382/100 |
| 2013/0114847 | A1* | 5/2013 | Petrovic | G06K 9/6807 382/100 |
| 2016/0093059 | A1* | 3/2016 | Tumanov | G06T 7/11 382/173 |
| 2016/0239935 | A1* | 8/2016 | Holstun | G06T 3/00 |

FOREIGN PATENT DOCUMENTS

| KR | 20110019787 A | 2/2011 |
|---|---|---|
| KR | 20110030054 A | 3/2011 |

OTHER PUBLICATIONS

Yang, Y. et al., A Contrast-sensitive Reversible Visible Image Watermarking Technique, (Research Paper), IEEE Transactions on Circuits and Systems for Video Technology, May 2009, pp. 656-667, vol. 19; No. 5.

* cited by examiner

DIGITAL WATERMARKS

BACKGROUND

Digital watermarks are used for a variety of purposes. Examples digital watermarks include a copyright notice identifying an owner of an image, a barcode, or information for determining the authenticity of the image such as for printed currency or for anti-counterfeiting measures.

BRIEF DESCRIPTION OF THE DRAWINGS

Some examples are described with respect to the following figures.

DETAILED DESCRIPTION

Before particular examples of the present disclosure are disclosed and described, it is to be understood that this disclosure is not limited to the particular examples disclosed herein as such may vary to some degree. It is also to be understood that the terminology used herein is used for the purpose of describing particular examples only and is not intended to be limiting, as the scope of the present disclosure will be defined only by the appended claims and equivalents thereof.

Notwithstanding the foregoing, the following terminology is understood to mean the following when recited by the specification or the claims. The singular forms "a," "an," and "the" are intended to mean "one or more." For example, "a part" includes reference to one or more of such a "part." Further, the terms "including" and "having" are intended to have the same meaning as the term "comprising" has in patent law. The terms "substantially" and "about" mean a ±10% variance.

Signal quality of a printed image, as detected by a sensor of an image capture device, may rapidly degrade as the image capture distance increases, because the printed image may extend over fewer of the sensor's pixels. Thus, digital watermarks in printed images may not be detectable and decodable by image capture devices at a variety of printed image sizes or at a variety of capture distances between the printed image and the image capture device such as a mobile device of a user. For example, a small digital watermark may not be detectable at a large capture distance, and a large digital watermark may not be detectable at a small capture distance.

Accordingly, the present disclosure concerns imaging systems, computer readable storage media, and methods of processing an image. Multiple instances of a digital watermark having varying sizes may be embedded in a digital image to enable digital watermark reading at different capture distances. For example, a large digital watermark may occupy a relatively large portion of the image relative to a small digital watermark. Thus, the image capture device may capture the large digital watermark from a larger capture distance than the distance from which it may capture the small digital watermark. A user may be able to capture the digital watermark at various locations and capture distances, for example from inches to up to 30 feet. For example, if a digital watermark is embedded into a poster-sized printed image, the exact distance between the user and the image may vary, and it may not be clear to a user which portion of the printed image the user should scan with the image capture device. Thus, the disclosure herein may allow the user to capture the printed image at varying capture distances, including small distances, and very large distances such as 30 feet.

Figure 1:
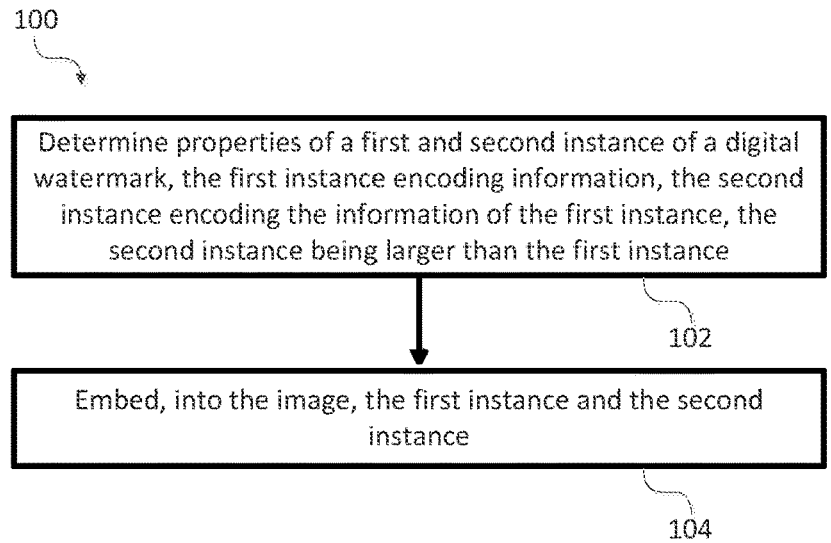
FIG. 1 is a flow diagram illustrating a method of image processing according to some examples.

FIG. 1 is a flow diagram illustrating a method 100 of processing an image according to some examples. The method may be computer implemented. At block 102, properties of a first instance and a second instance of a digital watermark may be determined. The first instance may encode information, and the second instance may encode the information of the first instance. The second instance may be larger than the first instance. At block 104, the first instance and the second Instance may be embedded into the image.

A "digital watermark" is a portion of an image that represents encoded information. In some examples, the encoded information represented by the digital watermark may be, for example, a copyright notice, a uniform resource locator (URL), a barcode, or information for determining the authenticity of the image such as for printed currency or for anti-counterfeiting measures.

An "instance" of a digital watermark is a representation of the digital watermark that encodes information of the digital watermark. Different instances of a given digital watermark may encode all of the same information or at least some of the same information. Different instances of the same digital watermark may be of the same size or of different sizes, and/or may be encoded according to the same modulation techniques or different modulation techniques. Thus, different instances of the same digital watermark may have one or more different attributes, such as different sizes, pixel modulation techniques, or the like, or a combination thereof. Some instances may be embedded into all of the pixels of the overall image, and other instances may be cells that are embedded into a subset of the pixels of the overall image. An instance may be generated by modulating pixels of the image. For example, hue, chroma, and/or luminance of pixels of an image may be modulated to generate an instance. Each instance may be embedded in an overt or covert manner, for example.

An overt instance may be perceptible to a human user and may be detectable and decodable, using image processing techniques, by an imaging system having a suitable image capture device, computer system, and suitable software. For example, an overt instance may include a pattern decodable by both humans and machines, such as text, a word, a symbol, or a logo in red that is superposed over the image. In this example, the pixels of the image may be modulated significantly enough from their original values such that the text, word, symbol, or logo is detectable and decodable by a human user, and by an imaging system using optical character recognition (OCR). In other examples, an overt instance may include information embedded in an image in a machine-readable format. For example, the machine readable format may include a machine readable pattern of pixels that is not decodable by a human user without the aid of a suitable imaging system having a computer system and image capture device. An example of such a machine readable pattern is a barcode. The pixels of the pattern may be modulated significantly from their original values. Thus, the pattern may be perceptible to but not decodable by a human user, but may be detectable and decodable by the imaging system. The visibility of the machine readable pattern on a printed image to a human user may aid the human user in pointing an image capture device at the machine readable pattern such that the image capture device may detect and decode the machine readable pattern.

A covert instance may not be perceptible to a human user of the image, but may be detectable and decodable, using image processing techniques, by an imaging system having a suitable image capture device, computer system, and suitable software. For example, a covert instance may include a pattern decodable by both humans and machines, such as text, a word, a symbol, or a logo that is superposed over the image. In this example, the pixels of the image may be modulated slightly from their original values such that the text, word, symbol, or logo is not perceptible to a human user, but is detectable and decodable by an imaging system. In other examples, a covert instance may include information embedded in an image in a machine-readable format. For example, the machine readable format may include a machine readable pattern of pixels that is neither perceptible to nor decodable by a human user without the aid of a suitable imaging system having a computer system and image capture device. An example of such a machine readable pattern is a barcode. However, such a machine readable pattern may be detectable and decodable by the imaging system.

Figure 2:
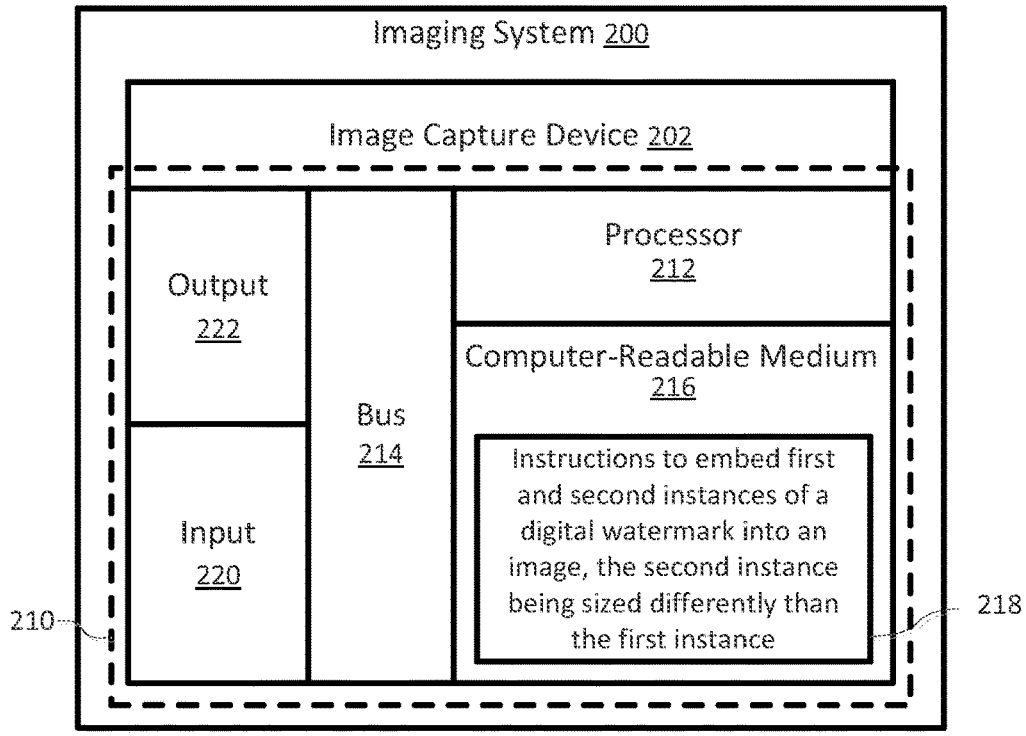
FIG. 2 is a simplified illustration of an imaging system according to some examples.

FIG. 2 is a simplified illustration of an imaging system 200 according to some examples. The imaging system 200 may include one or more image capture devices 202 and a computer system 210. Any of the operations and methods disclosed herein may be implemented and controlled in the imaging system 200, image capture device 202, and/or computer system 210. The computer system 210 may, for example, be integrated in or may be external to the image capture device 202. The computer system 210 and/or the image capture device 202 may include part of a smartphone, laptop, desktop, scanner, digital camera, video camera, charge-coupled device (CCD) camera, digital glasses that may be wearable by a human user, or the like.

The computer system 210 may include a processor 212 for executing instructions such as those described in the methods herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

Thus, each computer system 210 may support direct user interaction. For example, the imaging system 200 may include user input devices 220 coupled to the processor 202, such as one or more of a keyboard, touchpad, buttons, keypad, dials, mouse, track-ball, card reader, or other input devices. Additionally, the imaging system 200 may include output devices 222 coupled to the processor 212, such as one or more of a liquid crystal display (LCD), printer, video monitor, touch screen display, a light-emitting diode (LED), camera display, or other output devices. The output devices 222 may be responsive to instructions to display textual display, or a graphical display such as any of images and digital watermarks generated or captured in the methods disclosed herein.

The processor 212 may be in communication with a computer-readable storage medium 216 via a communication bus 214. The computer-readable storage medium 216 may include a single medium or multiple media. For example, the computer readable storage medium 216 may include one or both of a memory of the ASIC, and a separate memory in the computer system 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any one or more of the methods or operations disclosed herein according to various examples. For example, the computer executable instructions 218 may be to embed a first instance of a digital watermark into an image, wherein the first instance may encode information. The computer executable instructions 218 further may be to embed a second instance of the digital watermark into the image, wherein the second instance may encode the information of the first instance, and the second instance may be a sized differently than the first instance.

Figure 3:
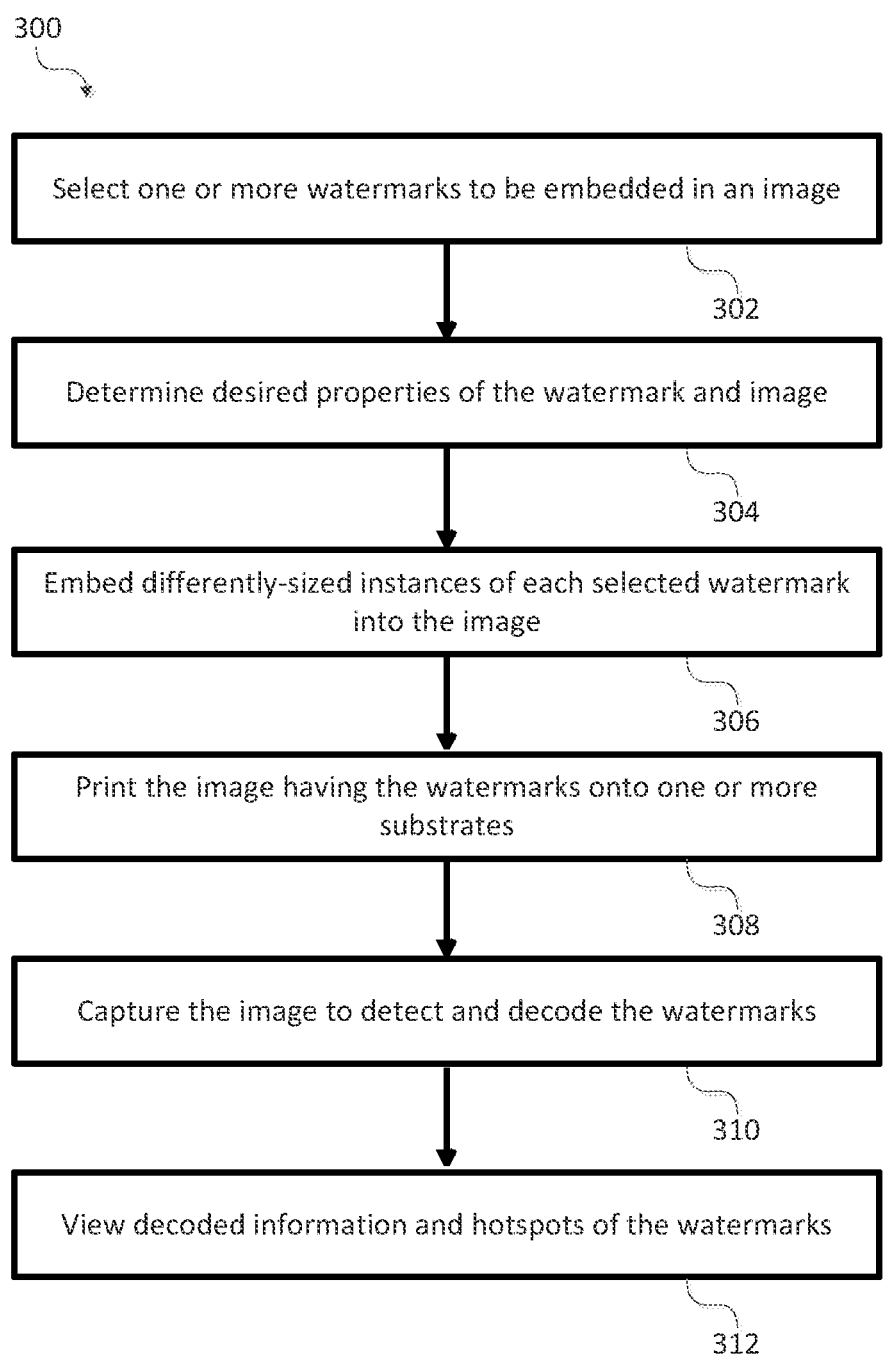
FIG. 3 is a flow diagram illustrating a method of a method of image processing according to some examples.

FIG. 3 is a flow diagram illustrating a method 300 of image processing according to some examples. In describing FIG. 3, reference will be made to FIG. 2 and to FIGS. 4-11, each of which is a schematic diagram of an example image having multiple differently-sized instances of a digital watermark. In some examples, the ordering shown may be varied, such that some steps may occur simultaneously, some steps may be added, and some steps may be omitted.

At block 302, one or more digital watermarks to be embedded in an image may be selected. The selected digital watermark may have particular copyright information encoded therein, for example. In some examples, the image may be an image generated by a computer program. In other examples, the image may have been captured by an image capture device 202. The image may represent any type of scene, and may include persons and/or objects, for example. The image may be received by the computer system 200 and stored in the computer-readable storage medium 216. The image may be stored in any suitable format, such as raster formats. Example formats include JPEG, GIF, TIFF, RAW, PNG, BMP, PPM, PGM, PBM, XBM, ILBM, WBMP, PNM, CGM, SVG, and PDF. In some examples, the image may be represented by a grid of pixels, for example at a resolution of 3,000 pixels by 4,000 pixels, which is 12 megapixels. But a single value can't represent a grid). In some examples, each pixel may be represented by any number of bits, for example 8 bits enabling 256 colors, 16 bits enabling 65,536 colors, or 24 bits enabling 16,777,216 colors. The image may, for example, be a grayscale image, or may be a color image having R, G, and B components.

At block 304, desired properties of each instance of the digital watermark to be embedded in the image may be determined.

In some examples, for each digital watermark selected at block 302, a selection may be made, automatically by the imaging system 200 or manually by a user using an input device 220 upon being prompted, regarding one or more of (1) the distances at which it is desired that the instances be detectable by an image capture device 202 when the image is printed, and (2) an expected printing size of the image.

These selections may be used by the computer system 210 to determine one or more of the following five properties of the image and digital watermarks: (1) how many different sizes of instances of the digital watermark are to be embedded in the image, (2) the different sizes of each instance relative to the size of the image, (3) for each set of instances having the same size, how many instances of that size are to be embedded in the image, (4) the locations in the image at which to embed each instance in the set, and (5) the pixel modulation techniques to be used for embedding each instance.

Example pixel modulation techniques are as follows. In some examples, the pixel values of each instance of a digital watermark may be predefined, and thus may be independent of the pixel values of the underlying image. In other examples, the pixel values of each instance may depend on the underlying image's pixel values at and/or near the location in the image at which the respective instance is to be embedded. For example, the pixel values of the image may be modulated in hue, chroma, and/or luminance to generate each instance. In examples in which an instance is covert, the modulation may, for example, be sufficient for the instance to be detectable by an image capture device 202 using image processing techniques, but not perceptible by a human user. Additionally, in some examples, the modulation of the image may be performed so as not to remove fine-grained structures in the image, not to degrade quality of the image, to provide for sufficient information storage in the digital watermark, and to provide for detection by an image capture device using low processing overhead.

Thus, in some examples, input may be received from a user regarding capture distances at which the first and second instances are desired to be detectable by an image capture device. Then, properties of instances of the digital watermark may be based on the input.

However, in some examples, the five properties above may be directly selected by the imaging system 200 or the user. In such case, the computer system 210 may not need to make any further determinations, for example. However, in examples in which the user selects the properties, the user may additionally enter the expected printing size of the image. In response, the computer system 210 may provide, based on the properties and based on the expected printing size, feedback regarding the expected distances at which the digital watermark may be detectable by the image capture device 202. If the user is satisfied with the expected distances, then the user may confirm the selections of the properties. If the user is not satisfied, the user may modify the selections and again receive additional iterations of feedback from the computer system 210 until the user is satisfied with the selections.

Additionally, in some examples, the user or computer system 210 may determine another property of each instance, i.e. whether each instance of each digital watermark is to operate as a "clickable hotspot", which is a clickable region that, when clicked on by a user using appropriate software to view the image, may cause an action to be performed. In some examples, in response to a click, information encoded in the digital watermark may be displayed. The information may be about an object that was clicked on in the digital watermark. In some examples, the clickable region may be a hyperlink, for example to a URL, that causes a document or webpage to open, for example a document or webpage about an object that was clicked on in the image. In some examples, a first instance of a digital watermark may encode the clickable hotspot, and a second instance of the same digital watermark may not encode the clickable hotspot.

At block 306, each selected instance of each selected digital watermark may be embedded into the image, based on the properties selected at block 304. FIGS. 4-11 illustrate example images having various patterns of multiple differently-sized embedded instances of each of one or more digital watermark. For example, the images may each have multiple instances of a digital watermark, including a small sized instance of the digital watermark, and relatively larger instances that are scaled-up versions of the small sized instance. For example, if overt copyright information is encoded in differently sized instances of the same watermark, the differently-sized instances may, for example, respectively encode different sizes of the text "copyrighted content." In some examples, in a given image, there may be two, three, four, five, or more sizes of instances of digital watermarks, each of which may be scaled differently relative to each other, but may each encode the same information.

Thus, there may be a variety of other patterns that may be embedded in addition to those shown in the figures. FIGS. 4-7 illustrate examples of images having digital watermark instances that do not overlap, and FIGS. 8-11 illustrate examples of images having digital watermark instances that overlap. Although FIGS. 8-11 show the instances fully overlapping, in other example the instances may partially or at least partially overlap.

Figure 4:
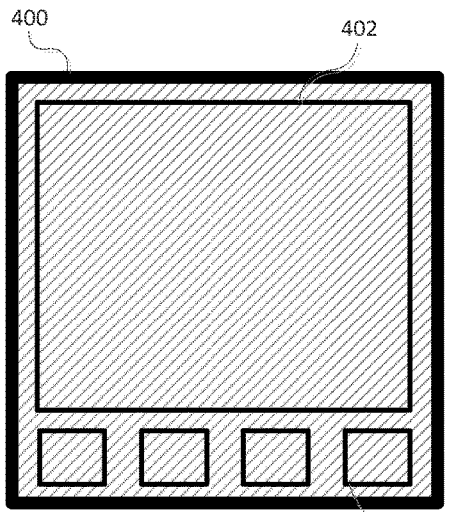
FIGS. 4-11 are each a schematic diagram of an example image having multiple differently-sized embedded instances of a digital watermark.

FIG. 4 illustrates an image 400 having multiple instances 402 and 404 of one digital watermark, with one very large sized instance 402 that covers most of the image, and four small sized instances 404 relatively smaller than the very large sized instance 402 and arranged in a row adjacent to the very large sized instance 402.

Figure 5:
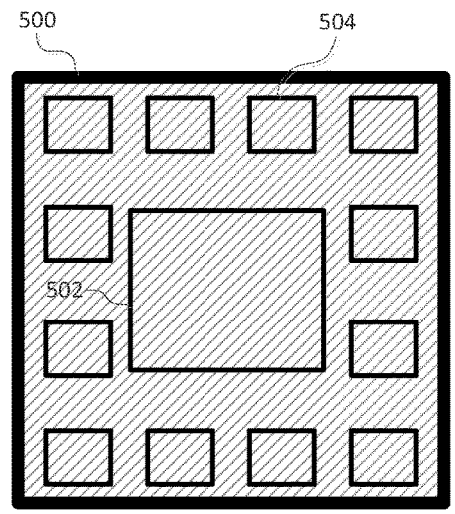

FIG. 5 illustrates an image 500 having multiple instances 502 and 504 of one digital watermark, with one large sized instance 502 and twelve small sized instances 504 relatively smaller than the large sized instance 504 and circumferentially surrounding the large instance 502.

Figure 6:
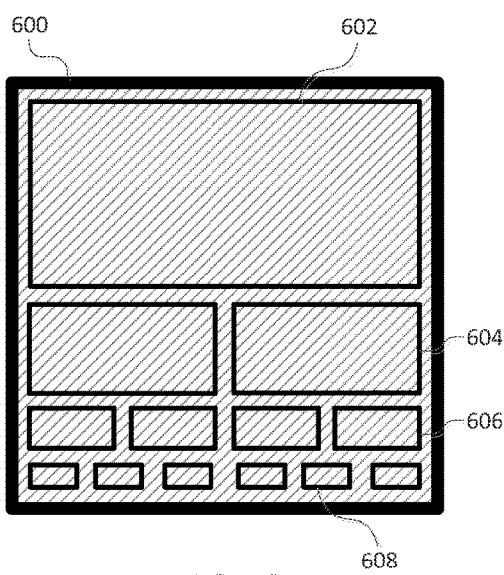

FIG. 6 illustrates an image 600 having multiple instances 602, 604, 606, and 608 of one digital watermark, with one large sized instance 602, two medium sized instances 604 relatively smaller than the large sized instance 602 and arranged in a row adjacent to the large sized instance 602. Image 600 also includes four small sized instances 606, relatively smaller than the medium sized instances 604, arranged in a row adjacent to the medium sized instances 604, and six very small sized instances 608, relatively smaller than the small sized instances 606, arranged in a row adjacent to the small sized instances 608.

Figure 7:
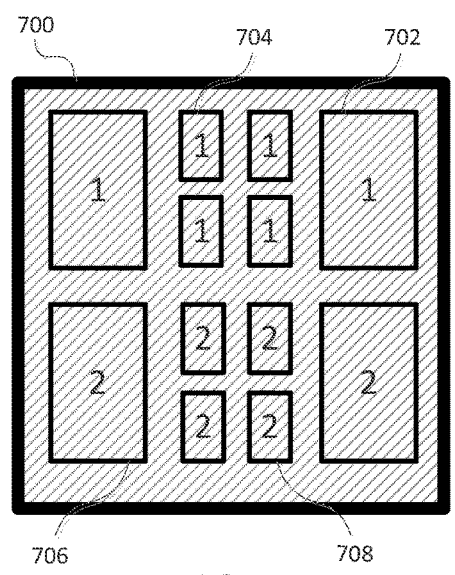

FIG. 7 illustrates an image 700 having multiple instances 702 and 704 of a first digital watermark and multiple instances 706 and 708 of a second digital watermark. The first digital watermark has two large sized instances 702, with a grid of four small digital watermarks 704 relatively smaller than the large sized instances 702 and disposed between the large sized instances 702. Similarly, the second digital watermark has two large sized instances 706, with a grid of four small sized digital watermarks 708 relatively smaller than the large sized instances 702 and disposed between the large sized instances 706.

Figure 8:
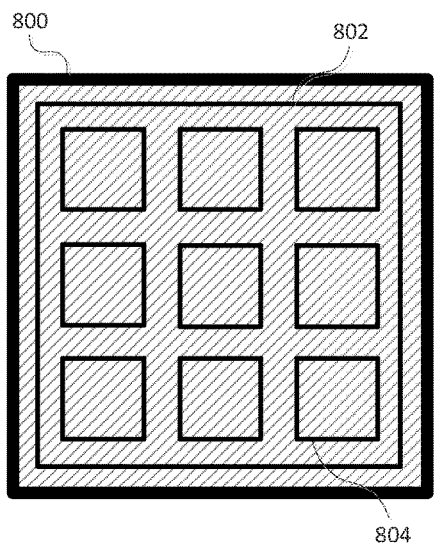

FIG. 8 illustrates an image 800 having multiple instances 802 and 804 of one digital watermark, with one very large sized instance 802 that covers most of the image, and a grid of nine small sized instances 804 relatively smaller than the very large sized instance 802 and arranged within and overlapping the very large sized instance 802.

Figure 9:
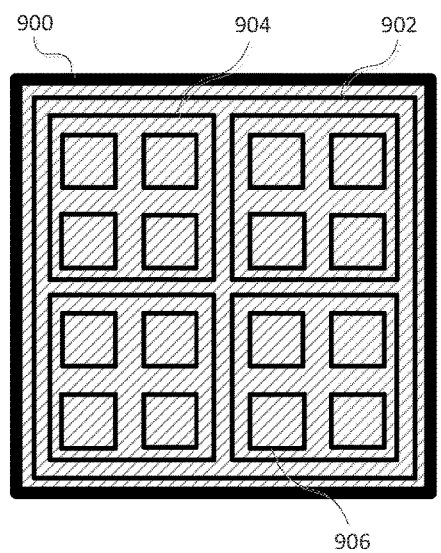

FIG. 9 illustrates an image 900 having multiple instances 902, 904, and 906 of one digital watermark, with one very large sized instance 902 that covers most of the image, and a grid of four medium sized instances 904 relatively smaller than the very large sized instance 902 and arranged within and overlapping the very large sized instance 902. Image 900 also includes a respective grid of four small sized instances 906 relatively smaller than the medium sized instances 904, arranged within and overlapping each of the medium sized instances 904. In FIGS. 8 and 9, by overlapping the instances, each sized instance covers substantially the entire image, thus each sized instance may be detectable by an image capture device 202 regardless of what part of the image the image capture device 202 may be capturing.

Figure 10:
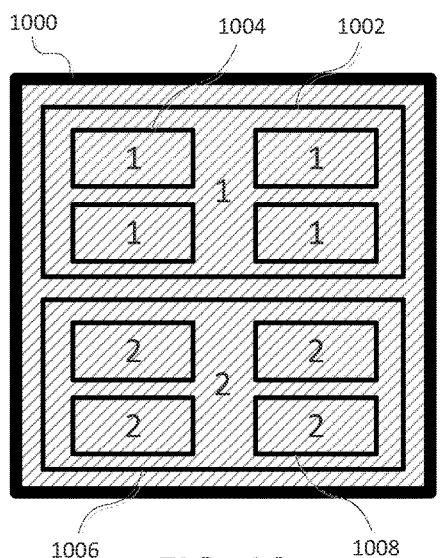

FIG. 10 illustrates an image 1000 having multiple instances 1002 and 1004 of a first digital watermark and multiple instances 1006 and 1008 of a second digital watermark. The first digital watermark has a large sized instance 1002, and a grid of four small sized instances 1004 relatively smaller than the large sized instance 1002 and arranged within and overlapping the large sized instance 1002. Similarly, the second digital watermark has a large sized instance 1006, and a grid of four small sized instances 1008 relatively smaller than the large sized instance 1006 and arranged within and overlapping the large sized instance 1006.

Figure 11:
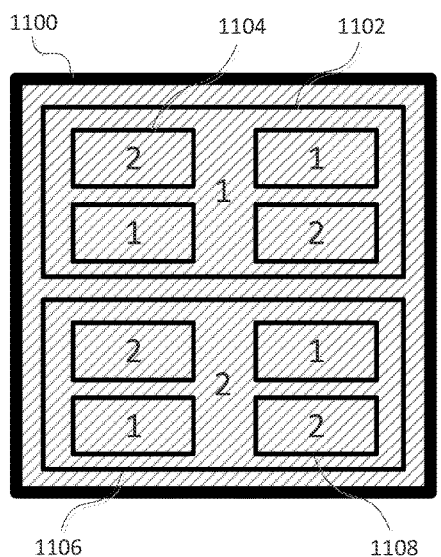

FIG. 11 illustrates an image 1100 having multiple instances 1102 and 1106 of a first digital watermark and multiple instances 1104 and 1108 of a second digital watermark. The first digital watermark has a large sized instance 1102, and a second digital watermark has a large sized instance 1106. In each of the two large sized instances 1102 and 1106, a grid of two small sized instances 1104 of the first digital watermark and two small sized instances 1108 of the second digital watermark, each of which are relatively smaller than the large sized instances 1102 and 1106, are arranged within and overlapping the respective large sized instance 1102 or 1106. This example illustrates how the small instances can be distributed throughout the image even where there are two digital watermarks.

Each of these digital watermarks of FIGS. 4-11 may be embedded according to the methods discussed earlier. Additionally, in some examples, differently-sized instances of the same watermark may be generated by first generating a first instance, and then scaling-up or scaling-down the first instance to generate additional instances. Additionally, for FIGS. 8-11, the following methods may be used to ensure that overlapping instances of a digital watermark are properly embedded. In some examples, the largest instances shown may be embedded first, such as instances 1102 and 1108 of FIG. 11. Then, the pixel values of the image having the embedded largest instances may be modulated to embed the overlapping next largest instances, such as instances 1104 and 1108. Then, the pixel values of the image having the embedded largest instances and next largest instances may be modulated to embed the overlapping next largest instances, such as instances 1106 and 1112. In some examples, individual pixels may be modulated in a small instance, and a group of pixels may be modulated for a large instance. For example, if a large instance has twice the width in both dimensions, and thus four times the area of a small instance, then for each single pixel modulated for the small instance, a group of four pixels may each be modulated for the large instance in the same way as the single pixel for the small instance.

Thus, in the example of FIG. 11, some pixels may, for example, be modulated one, two, or three times. However, because of the different sizes of the instances, detection may not be affected by the overlapping modulation. For example, the large instance 1102 may be detectable and decodable by an image capture device 202 even if some of the pixels of the large instance 1102 have been re-modulated to embed to the medium instance 1104. This is because at the distances at which the large instance 1102 may be used for detection, the re-modulated pixel values may only represent a minor change from the original pixel modulation of the large instance 1102.

However, in some examples, pixel modulation methods of overlapping instances may be different. For example, even though their information content may be the same given that they represent the same digital watermark, the large instance 1102 may be modulated primarily or substantially completely by modulating hue, the medium instance 1104 may be modulated primarily or substantially completely by modulating chrominance, and the small instance 1106 may be modulated primarily or substantially completely by modulating luminance.

At block 308, the image having the digital watermarks, such as the images of FIGS. 4-11, may be printed by an output device 222, such as a printer, onto one or more substrates of various sizes. The substrates may be any kind of printing paper or other physical media, for example. Although the example images in FIGS. 4-11 are shown having a square shape, any size and shape may be printed. For example, the image may be printed as 4 by 6 inches, 5 by 7 inches, 6 by 8 inches, 8 by 8 inches, 8 by 12 inches, 10 by 15 inches, 12 by 12 inches, 12 by 18 inches, 18 by 20 inches, 24 by 24 inches, 24 by 36 inches, of 27 by 40 inches, or larger values, for example.

At block 310, an image capture device 202 may be used to view, capture, and/or store the image. The image may be captured once from a single capture distance, or multiple captures of the image may be made from different distances. Thus, multiple copies of the image may be stored, wherein each copy may have a different capture distance. In examples in which multiple captures are made, the image capture device may, for example, be varied in distance as the multiple captures are made. For example, a user may vary the capture distance by physically moving while the image is automatically or manually captured at multiple distances using, for example, a digital camera, video camera, smartphone, or wearable digital glasses. Additionally, in some examples, rather than or in addition to physically moving, optical zoom may be adjusted during multiple captures to vary the apparent capture distance. The multiple captures may be performed with long periods between captures such as several seconds or minutes, may be performed in close succession as in a burst, and/or may be captured as part of a video stream.

Upon capturing the image, the imaging system 200 may apply image processing techniques to detect and decode information and hotspots contained in any instances of digital watermarks in each captured copy of the image. Because of the presence of differently-sized instances of each digital watermark, the imaging system 200 may be able to detect and decode the digital watermark at a variety of different capture distances between the image and the image capture device 202, and for a variety of sizes of the printed image. Additionally, in examples in which multiple copies of the image are captured at different capture distances, successful detection and decoding may be achieved as long as one captured instance in at least one of the copies of the captured image is detected and decoded.

In some examples, if the image is printed at a small size such as a small printed photograph being the size of a magazine, then for low capture distances such as about 3 to about 6 inches such as when a smartphone camera is hovered by a user over the printed image, a small instance such as instance 606 and/or 608 may be detected and decoded by the imaging system 200. For medium capture distances such as about 7 to about 12 inches, a medium instance such as instance 604 may be detected and decoded by the imaging system 200. For a large capture distance such as above 12 inches, a large instance such as instance 602 may be detected and decoded by the imaging system 200.

In some examples, if the image is printed at a large size such as a large poster or billboard, then for low capture distances such as below about 1 foot, a small instance such as instance 608 may be detected and decoded by the imaging system 200. For capture distances such as below about between about 1 and 3 feet, a small instance such as instance 606 may be detected and decoded by the imaging system 200. For medium capture distances such as about 3 to 10 feet, a medium instance such as instance 604 may be detected and decoded by the imaging system 200. For a large capture distance such as between about 10 feet and 40 feet, a large instance such as instance 602 may be detected and decoded by the imaging system 200.

Thus, in some examples, the digital watermarks may be robustly detectable and decodable regardless of the size of the printed image or the capture distance.

At block 312, once the information and hotspots in the digital watermarks are decoded, the imaging system 200 may take further action. For example, the user may view the image along with the now decoded information on the output devices 222 such as a smartphone screen. Additionally, using the input devices 220 such as a touch screen or keyboard, the user may click on the hotspots in the image to view decoded information and/or be directed by a hyperlink to a document, or to a URL of a webpage for example.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A non-transitory computer readable storage medium including executable instructions that, when executed by a processor, cause the processor to:
    receive, from a user, capture distances at which first and second instances of a digital watermark in an image are desired to be detectable by an image capture device, the capture distances different for the first instance and the second instance;
    embed the first instance of the digital watermark into the image, the first instance encoding information and having a size corresponding to a first one of the capture distances; and
    embed the second instance of the digital watermark into the image, the second instance encoding at least some of the information of the first instance and having a different size corresponding to a second one of the capture distances, wherein the first one of the capture distances is greater than the second one of the capture distances, and wherein the first instance is larger than the second instance.

2. The non-transitory computer readable storage medium of claim 1 wherein the first and second instances each encode a clickable hotspot.

3. The non-transitory computer readable storage medium of claim 1 wherein the first and second instances at least partially overlap.

4. The non-transitory computer readable storage medium of claim 1 wherein the first and second instances do not overlap.

5. The non-transitory computer readable storage medium of claim 1 wherein the executable instructions, when executed by a processor, further cause the processor to:
    receive, from the user, a third capture distance at which a third instance of a digital watermark in the image is desired to be detectable by the image capture device, the third capture distance different for the first and the capture distances; and
    embed, into the image the third instance of the digital watermark, the third instance encoding the information of the first instance, the third instance having a size corresponding to the third capture distance and different from the first and the second instances.

6. The non-transitory computer readable storage medium of claim 1 wherein each of the first and second instances is a covert instance having a machine readable pattern of pixels that is neither perceptible to, nor decodable by, a human user viewing without the aid of an imaging system a print of the image that includes the instances.

7. The non-transitory computer readable storage medium of claim 1 wherein the first and second instances are embedded using different pixel modulation techniques.

8. The non-transitory computer readable storage medium of claim 1 wherein the executable instructions, when executed by a processor, further cause the processor to embed, into the image, multiple differently sized instances of a second digital watermark into the image.

9. A computer implemented method of processing an image, the computer implemented method comprising:
    receiving, from a user, capture distances at which first and second instances of a digital watermark in an image are desired to be detectable by an image capture device, the capture distances different for the first instance and the second instance;
    embedding the first instance into the image, the first instance encoding information and having a size corresponding to a first one of the capture distances; and
    embedding the second instance into the image, the second instance encoding the information of the first instance and having a different size corresponding to a second one of the capture distances, wherein the first one of the capture distances is greater than the second one of the capture distances, and wherein the first instance is larger than the second instance.

10. The computer implemented method of claim 9 wherein the first and second instances each encode a clickable hotspot.

11. The computer implemented method of claim 9 wherein the first and second instances at least partially overlap.

12. An imaging system comprising:
    a processor to:
        receive, from a user, capture distances at which first and second instances of a digital watermark in an image are desired to be detectable by an image capture device, the capture distances different for the first instance and the second instance;
        embed the first instance into the image, the first instance encoding information and having a size corresponding to a first one of the capture distances; and embed the second instance into the image, the second instance encoding the information of the first instance and having a different size corresponding to a second one of the capture distances, wherein the first one of the capture distances is greater than the second one of the capture distances, and wherein the first instance is larger than the second instance.

13. The imaging system of claim 12 wherein the first and second instances each encode a clickable hotspot.

14. The imaging system of claim 12 wherein the first and second instances at least partially overlap.

15. The non-transitory computer readable storage medium of claim 1 wherein the image is an image printed on a non-electronic print medium and capturable by the image capture device.

16. The non-transitory computer readable storage medium of claim 1 wherein the first and second instances overlap in the image, and wherein the larger of the first and second instances is embedded into the image before the smaller of the first and second instances is embedding into the image.

17. The non-transitory computer readable storage medium of claim 1 wherein the first and second instances are embedded into the image by pixel modulation, and wherein each of the instances is embedded by modulating by a different one of pixel hue, chrominance, or luminance.

* * * * *